United States Patent [19]

Donovan et al.

[11] 4,418,516
[45] Dec. 6, 1983

[54] TRANSPORT LOCK ACTUATOR

[75] Inventors: James T. Donovan, Gordonville; E. Graham Webster, New Holland, both of Pa.

[73] Assignee: Sperry Corporation, New Holland, Pa.

[21] Appl. No.: 364,951

[22] Filed: Apr. 2, 1982

[51] Int. Cl.³ ............................................. A01B 73/00
[52] U.S. Cl. ...................................... 56/228; 56/15.5; 172/679; 280/462
[58] Field of Search .................. 56/228; 280/463, 462, 280/467, 468; 172/679, 625, 245; 56/15.5

[56] References Cited

U.S. PATENT DOCUMENTS

| | | | |
|---|---|---|---|
| 3,751,071 | 8/1973 | Patterson et al. | 172/679 |
| 3,832,837 | 9/1974 | Burkhart et al. | 56/228 |
| 3,919,831 | 11/1975 | Halls et al. | 56/228 |
| 3,993,206 | 11/1976 | Jomen et al. | 280/468 |
| 4,037,395 | 7/1977 | Henkensiefken et al. | 56/228 |
| 4,081,946 | 4/1978 | Ehrhart | 56/15.8 |

Primary Examiner—Paul J. Hirsch
Attorney, Agent, or Firm—Larry W. Miller; Frank A. Seemar; Darrell F. Marquette

[57] ABSTRACT

A transport lock actuating mechanism for a crop harvesting machine having a pivotally moveable tongue mounted to the frame of the harvesting machine, commonly referred to as a pivot-tongue windrower, is disclosed wherein a single spring is compressed to exert a biasing force on a locking pin to urge the pin through suitable aligned apertures in the base of the tongue and in the frame of the machine to automatically extend the locking pin through the apertures when they become aligned due to manipulation of the pivotal movement of the tongue by the operator at a location remote from the locking pin. The transport lock actuating mechanism is alternatively operable to exert a biasing force on the locking pin to urge the locking pin into a position withdrawn from the apertures so that the machine can be moved from a transport position to an operating position.

10 Claims, 9 Drawing Figures

TRANSPORT LOCK ACTUATOR

BACKGROUND OF THE INVENTION

The present invention relates generally to crop harvesting machines, commonly referred to as pivot-tongue windrowers, and; more particularly, to an actuating mechanism for automatically moving a locking pin between locked and unlocked positions.

Pivot-tongue harvesting machines, such as the windrower depicted in U.S. Pat. No. 3,832,837, have been developed to enable the operator to swing the harvester from a transport position rearwardly of the tractor to an outwardly operating position by manipulation of the position of the tongue relative to the frame of the machine. Pivot-tongue windrowers having the pivotable tongue mounted near the center of the harvester, such as seen in U.S. Pat. No. 4,081,946, can be used to harvest crop to either side of the tractor, as well as be transported in a position directly rearwardly of the tractor. Locking devices have been used to lock the harvester in its transport position when being transported from one job location to another.

One such locking device is a pin inserted through appropriately aligned holes in the movable tongue and the stationary frame. This locking pin would then prevent the tongue from moving relative to the frame and, therefore, lock the machine in its transport position. As can be seen in the aforementioned U.S. Pat. No. 4,081,946, the position of the tongue or draw bar relative to the frame is controlled through manipulation of a hydraulic cylinder operatively interconnecting the tongue and the frame; however, because of the desire to control the operating position of the harvester during operation thereof, the controls for the manipulation of the hydraulic cylinder are generally located on the tractor.

Since the two holes corresponding to the tongue and the frame, respectively, must be aligned before the locking pin can be inserted, the procedure for locking the harvester in its transport position can be both frustrating and time-consuming if undertaken by only one person, due to the numerous trips between the tractor and the rear of the harvester that may be necessary to assure proper alignment of the holes. Conversely, the withdrawal of the locking pin also requires proper alignment of the corresponding holes, as a slight misalignment may bind the locking pin and make withdrawal thereof difficult.

Accordingly, it would be desirable to provide an actuating mechanism that would be operable to automatically insert or withdraw the locking pin through the corresponding holes when they become aligned while the operator is at the tractor operating the controls to manipulate the hydraulic cylinder and, thereby, aligning the holes.

SUMMARY OF THE INVENTION

It is an object of this invention to overcome the aforementioned disadvantages of the prior art by providing a transport lock actuator that is operable to automatically insert or withdraw a locking pin through a pair of alignable holes when they become aligned.

It is another object of this invention to provide a transport lock actuator that is operable to both lock and unlock the transport position of a harvester.

It is an advantage of this invention that an operator can actuate the transport lock of a pivot-tongue harvester from his tractor by manipulation of the hydraulic cylinder to pivot the tongue relative to the frame of the machine without making repeated trips to the harvester to determine if the holes are aligned.

It is a feature of this invention that the transport lock actuating mechanism is simple and economical in design and construction.

It is still another object of this invention to utilize a single spring to bias the locking pin in either a locked or unlocked position.

It is another feature of this invention that a visual sight indicator can be attached to the transport lock actuator to indicate to the operator in the tractor when the locking pin is fully in either its locked or unlocked position.

It is a further object of this invention to provide a transport locking pin actuator which is durable in construction inexpensive of manufacture, carefree of maintenance, facile in assemblage, and simple and effective in use.

These and other objects, features and advantages are accomplished according to the instant invention by providing a transport lock actuating mechanism for a crop harvesting machine having a pivotally moveable tongue mounted to the frame of the harvesting machine, wherein a single spring is compressed to exert a biasing force on a locking pin to urge the pin through suitably aligned apertures in the base of the tongue and in the frame of the machine to automatically extend the locking pin through the apertures when they become aligned due to manipulation of the pivotal movement of the tongue by the operator at a location remote from the locking pin. The transport lock actuating mechanism is alternatively operable to exert a biasing force on the locking pin to urge the locking pin into a position withdrawn from the apertures so that the machine can be moved from a transport position to an operating position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
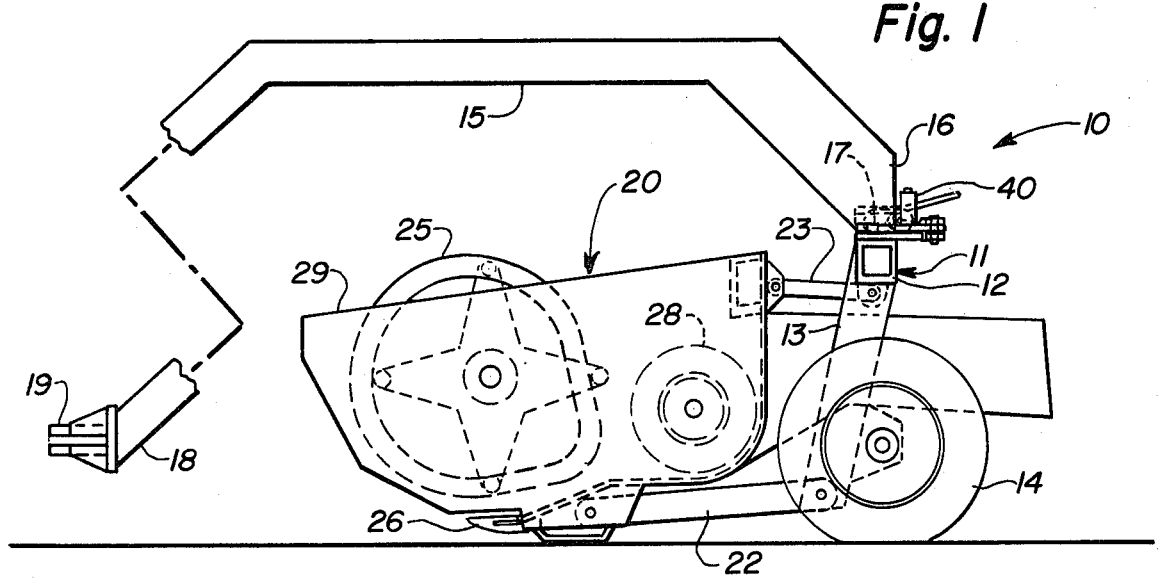
FIG. 1 is a side-elevational view of a crop harvesting machine, commonly referred to as a pivot-tongue windrower, incorporating the principles of the instant invention.
Figure 2:
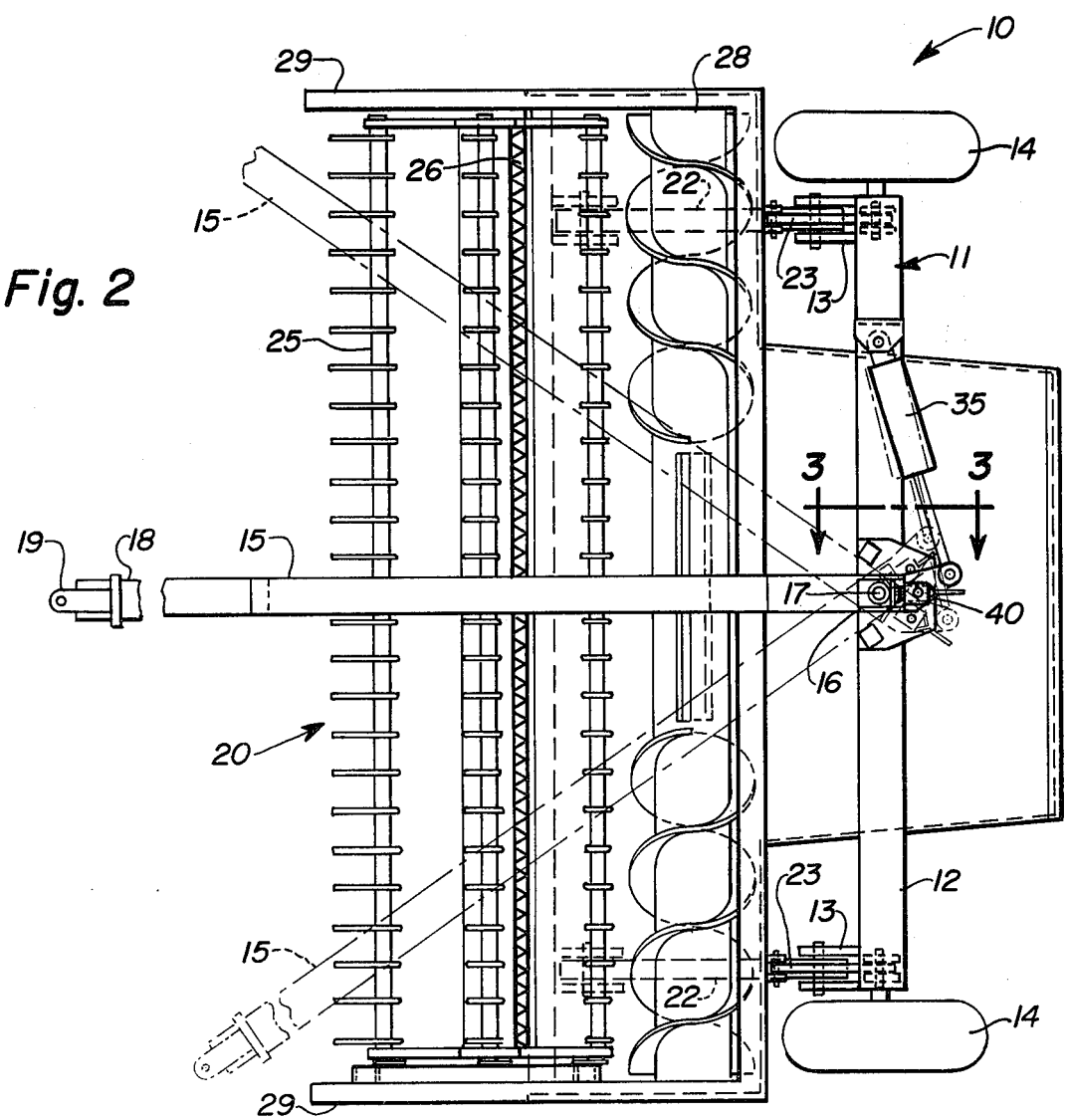
FIG. 2 is a top-plan view of the crop harvesting machine seen in FIG. 1; the extreme operating positions of the pivotally mounted tongue being shown in phantom.

Referring now to the drawings and, particularly, to FIGS. 1 and 2, and a side elevational view and a top plan view of a crop harvesting machine, commonly referred to as a pivot-tongue windrower, can be seen. Any left or right references are used as a matter of convenience and are determined by standing at the rear of the machine facing the forward end, the direction of travel.

The pivot-tongue windrower 10 is of the type described in U.S. Pat. No. 4,081,946, issued to Philip J. Ehrhart on Apr. 4, 1978. The windrower 10 includes a generally U-shaped frame 11 having a transverse beam member 12 and downwardly depending leg members 13 unto which wheels 14 are mounted. An arched tongue 15 pivotally connects at its rearward end 16 to the frame 11 by a generally vertically aligned pivot axis 17, such that the tongue 15 is pivotally moveable in a transverse direction from left to right. The arched tongue 15 projects forwardly from the frame 11 over top of the header 20 and terminates at its forward end 18 in a clevis 19 which is adapted for connection to a source of motive power, such as a tractor.

The header 20 is pivotally connected to the frame 11 by a pair of lower links 22 and at least one upper link 23 so that the header 20 is free to move in a generally vertical direction relative to the frame 11 through the use of a header lift mechanism, not shown. The header 20 includes a reel 25 rotatably mounted between a pair of opposing sidesheets 29. Cutterbar 26 mounted between the sidesheets 29 below the reel 25 is operable to sever standing crop material. Harvesting machines such as the windrower 10 typically have a conditioning mechanism, not shown, mounted between the depending leg members 13 of the frame 11. If the width of the conditioning mechanism is less than the width of the header, as defined by the distance between the opposing sidesheets 19, a crop consolidating mechanism such as the auger 28 is generally provided to consolidate the severed crop and discharge it to the conditioning mechanism. The operation of the header 20 in harvesting standing crop is well known in the art and will not be discussed further.

Figure 3:
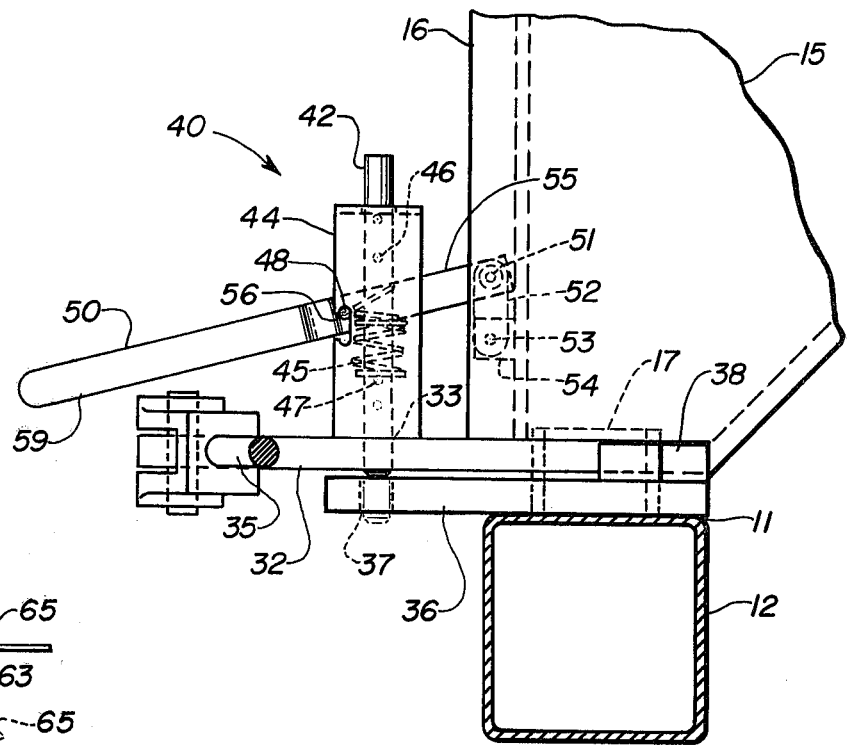
FIG. 3 is an enlarged side-elevational view of the transport lock actuator corresponding to lines 3—3 of FIG. 2; the locked position of the locking pin being shown in phantom.
Figure 4:
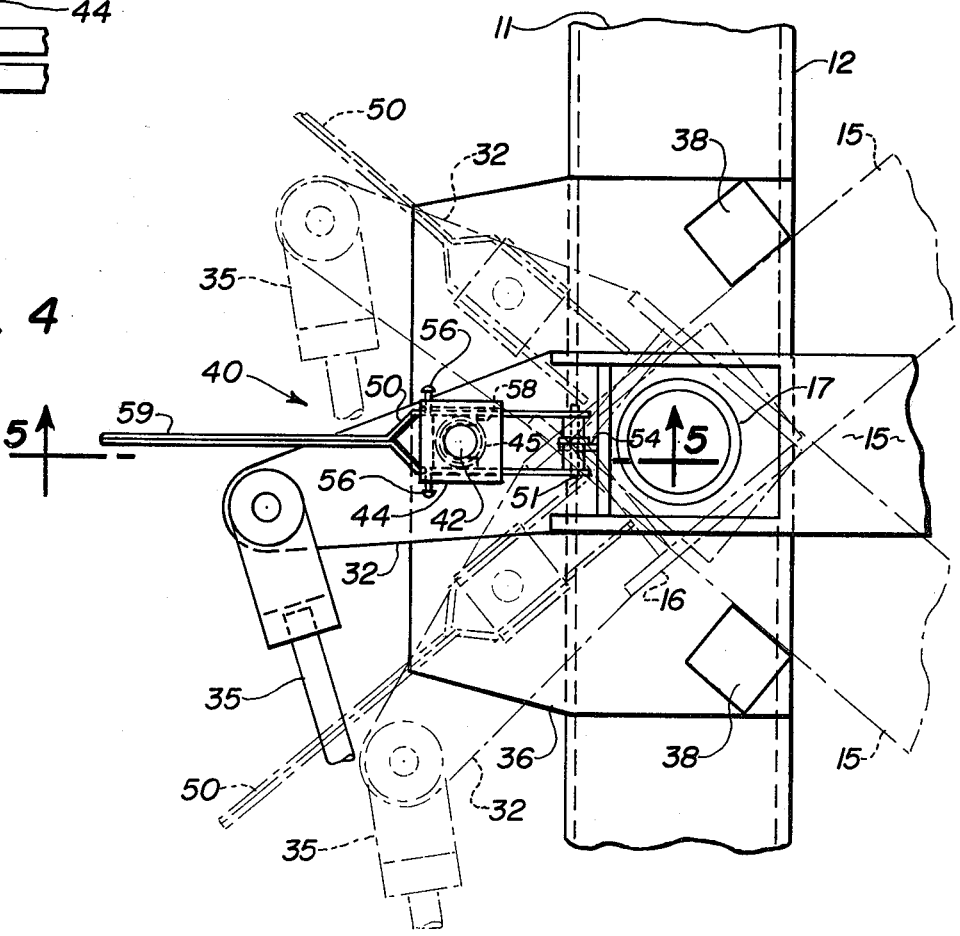
FIG. 4 is a top-plan view of the transport lock actuator seen in FIG. 3 with the operating positions of the tongue being shown in phantom.

Referring now to FIGS. 3 and 4, an enlarged view of the rearward end 16 of the arched tongue 15 can be seen. A base plate 32 is affixed to the rearward end 16 of the tongue 15 to be pivotable therewith relative to the frame 11 about the vertical pivot 17. A hydraulic cylinder 35 interconnecting the base plate 32 and the upper transverse beam 12 of the frame 11, as best seen in FIG. 2, provides a source of power for pivotally moving the arched tongue 15 about the pivot 17. A frame plate 36, corresponding to the base plate 32, is affixed to the upper transverse beam 12 such that the base plate 32 is moveable relative thereto and immediately thereabove. The frame plate 36 includes stops 38 to limit the amount of pivotal movement of the arched tongue 15 in both the left and right directions. The center position, seen in FIG. 4 in solid lines, is the transport position for a windrower 10 having its arched tongue 15 mounted near the center of the transverse beam 12. When the arched tongue 15 is in this transport position, a hole 33 in the base plate 32 is aligned with a corresponding hole 37 in the frame plate 36 to provide the capability of locking the pivotable tongue 15 in the transport position.

A transport lock actuating mechanism 40, using a locking pin 42 insertable through the holes 33 and 37 when aligned, is provided to lock the arched tongue 15 in its transport position. The locking pin 42 is slidably received within a generally U-shaped housing 44 affixed to the base plate 32 such that the locking pin 42 is positioned within the hole 33. A single spring 45 is concentrically mounted on the locking pin 42 and is free to slide along the length thereof. An upper stop 46 and a lower stop 47, in the form of pins inserted through the locking pin 42, serve as retention members to limit the amount of sliding movement of the spring 45. Additional pin stops 49 respectively positioned above the below the pin stops 46, 47 limit the amount of movement of the locking pin 42 relative to the housing 44 to define the locked and unlocked positions, described in detail below. The housing 44 includes a notch 48 formed therein for cooperation with an actuator lever 50 as will be described in detail below.

Figure 8:
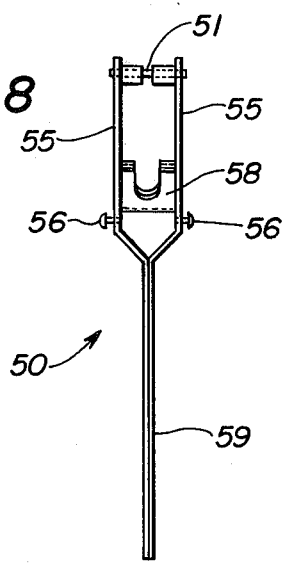
FIG. 8 is a detail view of the actuator lever.

The actuator lever 50 extends through the housing 44 for pivotal connection via pivot 51 to a link 52 which in turn is pivotally connected by pivot 53 to a tab 54 projecting from the rearward end 16 of the arched tongue 15. The actuating lever 50 is seen in detail in FIG. 8. The lever 50 is comprised of a pair of spaced apart members 55 having the pivot 51 interconnecting them at one end thereof and converging into a single handle 59 at the other end. Engagement pins 56 extend outwardly from the members 55 and are engageable with the notch 48 in the housing 44. A spring engagement member 58 is positioned between the spaced apart members 55 for operative engagement with the spring 45 to compress it, alternatively, upwardly against the upper pin stop 46 or downwardly against the lower pin stop 47.

Figure 5:
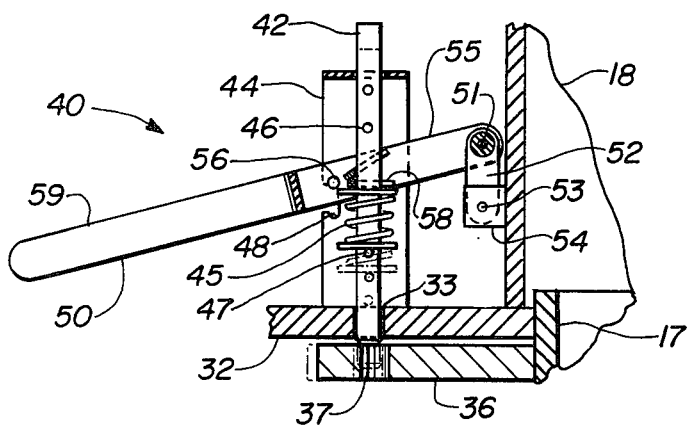
FIG. 5 is a cross-sectional view of the transport lock actuator taken along lines 5—5 of FIG. 4, with the locking pin being biased in a downward direction and the sight indicator being removed for clarity.
Figure 6:
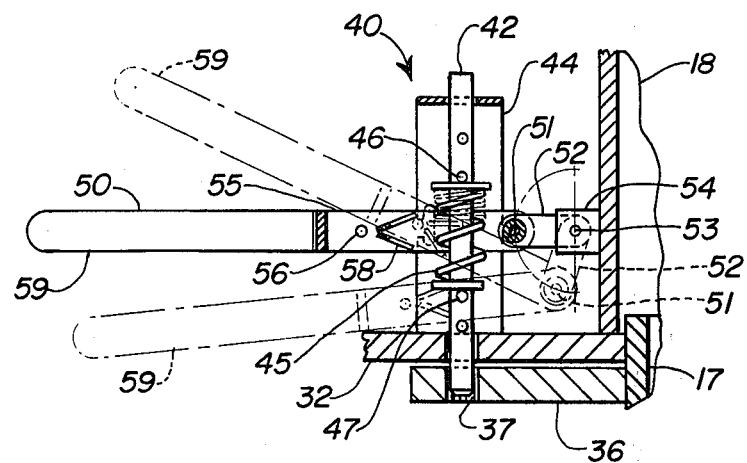
FIG. 6 is a cross-sectional view corresponding to FIG. 5 with the movement of the handle and linkage to change the biasing force of the spring to urge the locking pin upwardly being shown in phantom.
Figure 7:
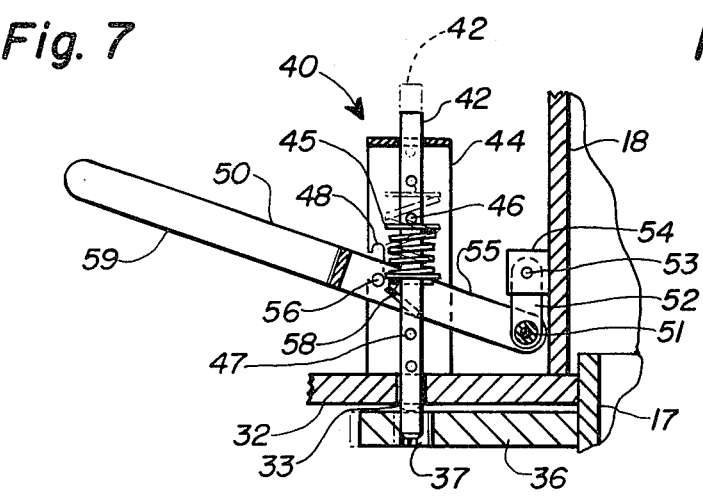
FIG. 7 is a cross-sectional view corresponding to FIG. 5 with the locking pin being biased in an upward direction, the fully upward position of the locking pin and spring being shown in phantom.

Referring now to the cross-sectional views of FIGS. 5, 6 and 7, the operation of the transport lock actuator 40 to bias the locking pin 42 in either a locked or unlocked position through the use of a single spring can be seen. When the locking pin 42 is in a locked or transport position, the locking pin 42 is inserted through both holes 33 and 37 to prevent relative motion between the base plate 32 and the frame plate 36, thereby locking the tongue 15 in its transport position. When the locking pin 42 is in an unlocked or operating position, the locking pin 42 is withdrawn from the hole 37 in the frame plate 36, although it may still be positioned within the hole 33 in the base plate 32, so that the base plate 32 is free to pivotally move with the rearward end 16 of the tongue 15 relative to the frame plate 36.

FIG. 5 depicts the transport lock actuator 40 in a position to bias the locking pin 42 toward its locked position. The actuator lever 50 is positioned to compress the spring 45 downwardly against the lower pin stop 47 and, thereby, urge the locking pin 42 downwardly toward its locked position. The engagement of the engagement pins 56 with the housing 44 in the notch 48 retains the actuator lever 50 in the position where the spring 45 is compressed downwardly against the lower pin stop 47. If the holes 33 and 37 are not aligned, actuation of the hydraulic cylinder 35 to pivotally rotate the tongue 15 and attached base plate 32 relative to the frame 11 will ultimately align the holes 33 and 37. When the holes 33 and 37 become aligned, the downward movement of the locking pin 42 is no longer restricted by the frame plate 36 and the biasing force exerted by the downwardly compressed spring 45 will move the locking pin 42 into its locked position through hole 37.

After transporting the windrower 10 from one location to another, it is not uncommon that the holes 33 and 37 become slightly misaligned even though the locking pin 42 is inserted through both holes 33 and 37. As a result, the locking pin 42 will bind between the base plate 32 and frame plate 36 and make if difficult to move the pin 42 into its operating position, unless the holes 33 and 37 become aligned.

FIG. 6 depicts the operation of the transport lock actuator 40 to switch the biasing force exerted by the spring 45 on the pin 42 and urge the locking pin 42 from its transport position toward its operating position. To switch the direction of the biasing force, the operator must move the actuator lever 50 downwardly and outwardly from the position seen in FIG. 5, such that the engagement pins 56 becomes disengaged from the notch 48 in the housing 44. This movement will swing the link 52 about its pivot 53 on the tab 54 to enable the actuating lever 50 to be positioned beneath the spring 45. An upward lifting of the lever 50 will then cause the spring engagement member 58 to contact the bottom of the spring 45 and compress it upwardly toward the upper pin stop 46. The engagement pins 56 on the lever 50 can then be reengaged within the notch 48 in the housing 44. As can be seen in FIG. 7, the link 52 has swung downwardly, relative to its position in FIG. 5, with the pivot 53 being located below the tab 54. When the hydraulic cylinder 35 is actuated to align the holes 33 and 37 more perfectly, the binding force on the locking pin 42 is released and the spring 45 will move the locking pin 42 into its transport position, as seen in phantom in FIG. 7.

Figure 9:
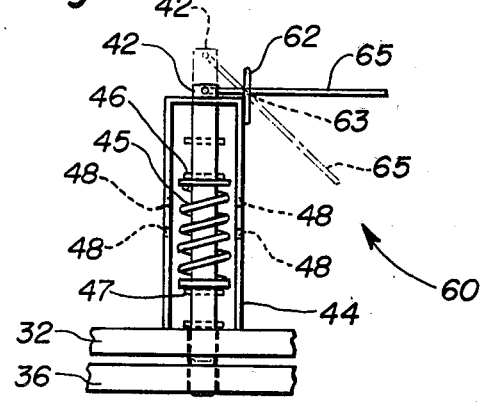
FIG. 9 is a simplified rear view of the transport lock actuator showing the addition of a visual sight indicator for indicating the position of the locking pin.

FIG. 9 depicts the addition of an optional visual sight indicator 60 to the transport lock actuator to indicate to the operator in the tractor whether the locking pin 42 has fully engaged or disengaged the frame plate 36. A bracket 62 having a slot-shaped hole 63 therein is affixed to the housing 44. A rod 65, pivotally connected to the locking pin 42 and movable therewith, extends through the slot-shaped hole 63 and projects beyond the tongue 15 where it can be seen by the operator at a remote location. When the locking pin 42 is in its locked position, the rod 65 will be horizontal, as shown in solid lines. When the locking pin 42 is in its unlocked position, the rod 65 will be inclined downwardly, as seen in phantom in FIG. 9.

It will be understood that various changes in the details, materials, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such description, may be employed in other embodiments, without departing from the scope of the invention. Accordingly, the following claims are intended to protect the invention broadly as well as in the specific form shown herein.

Having thus described the invention, what is claimed is:

1. In a crop harvesting machine having a mobile frame, said frame having a first aperture therethrough; harvesting apparatus supported by said frame for the harvesting of crop material; a tongue having a first end and a remote second end, said first end being pivotally mounted on said frame such that said tongue is pivotally moveable relative to said frame, said first end having a base member affixed thereto and pivotally moveable with said tongue relative to said frame, said base member having a second aperture therethrough alignable with said first aperture in said frame, said second end being adapted for connection to a primary mover; power means for pivotally moving said tongue relative to said frame; a locking pin insertable through said first and second apertures when said first and second apertures are aligned to lock said tongue in a preselected position relative to said frame, said locking pin being in a locked position when interengaged between said base member and said frame through said first and second apertures and in an operating position when disengaged from between said frame and said base member such that said tongue is free to pivotally move relative to said frame, the improvement comprising:
   a spring-loaded actuator operatively and selectively engaged with said locking pin to selectively bias said locking pin toward said locked position to automatically move said locking pin into said locked position when said first and second apertures become aligned due to the movement of said tongue by said power means, said actuator also being selectively operable to bias said locking pin toward said operating position to automatically move said locking pin into said operating position when said first and second apertures become aligned.

2. The crop harvesting machine of claim 1 wherein said actuator includes a housing for slideably receiving said locking pin for engagement with said base member and said frame through said first and second apertures.

3. The crop harvesting machine of claim 2 wherein said actuator further includes first and second spaced apart spring retention members and a lever pivotally mounted on said frame for engagement with said spring, said lever being selectively operable to compress said spring against said first retention member to bias said locking pin toward said locked position and selectively operable to compress said spring against said second retention member to bias said locking pin toward said operating position.

4. The crop harvesting machine of claim 3 wherein said spring is concentrically mounted on said locking pin for sliding movement relative thereto, said first and second spring retention members being affixed to said locking pin in a spaced apart relationship to define the limit of travel of said spring relative to said locking pin.

5. The crop harvesting machine of claim 4 wherein said first and second retention members are pins inserted through holes in said locking pin.

6. The crop harvesting machine of claim 3 or 4 wherein said lever includes an actuating member and a connecting link, said connecting link being pivotally connected to the first end of said tongue, said actuating member being pivotally connected to said connecting link.

7. The crop harvesting machine of claim 6 wherein said actuating member of said lever includes a spring engagement member, said actuating member being selectively positionable to engage said spring engagement member with one end of said spring to compress said spring against said first retention member when movement of said locking pin into said locked position is desired and with the other end of said spring to compress said spring against said second retention member when movement of said locking pin into said operating position is desired.

8. The crop harvesting machine of claim 7 wherein said lever actuating member further includes two spaced apart arms pivotably connected at one end to said connecting link and converging at the other end to form a handle, said actuating member being positioned such that said locking pin is between said spaced apart arms, said spring engagement member being affixed between said arms for engagement with said spring.

9. The crop harvesting machine of claim 8 wherein said housing has a notch-shaped opening formed therein, said lever actuating member having engagement pins affixed thereto for engagement within said notch-shaped opening in said housing to secure the position of said actuation member to maintain compression of said spring against said first and second retention members, respectively, until said locking pin moves to the respective desired position.

10. The crop harvesting machine of claim 9 wherein said housing is mounted on said base member for slideably receiving said locking pin in a generally vertical alignment substantially perpendicular to said base member.

* * * * *